(12) United States Patent
Shade et al.

(10) Patent No.: US 12,240,513 B2
(45) Date of Patent: Mar. 4, 2025

(54) SHELF-STOCKING UNIT

(71) Applicant: Presence from Innovation, LLC, Hazelwood, MO (US)

(72) Inventors: Raleigh J. Shade, Collinsville, IL (US); Kent L. Hanners, St. Charles, MO (US); Johnny Paul Glasgow, Pontoon Beach, IL (US)

(73) Assignee: Presence from Innovation, LLC, Hazelwood, MO (US)

( * ) Notice: Subject to any disclaimer, the term of this patent is extended or adjusted under 35 U.S.C. 154(b) by 0 days.

(21) Appl. No.: 18/166,319

(22) Filed: Feb. 8, 2023

(65) Prior Publication Data

US 2024/0262405 A1 Aug. 8, 2024

(51) Int. Cl.
| | |
|---|---|
| A47F 13/00 | (2006.01) |
| A47B 53/02 | (2006.01) |
| A47F 3/06 | (2006.01) |
| A47F 5/08 | (2006.01) |
| B62B 3/00 | (2006.01) |

(52) U.S. Cl.
CPC .............. *B62B 3/005* (2013.01); *A47B 53/02* (2013.01); *A47F 5/08* (2013.01); *A47F 13/00* (2013.01); *A47F 2003/066* (2013.01); *B62B 2301/044* (2013.01); *B62B 2301/08* (2013.01)

(58) Field of Classification Search
CPC .............. B62B 3/005; B62B 2301/044; B62B 2301/08; A47F 13/00; A47F 5/108; A47F 5/137; A47F 5/0093; A47F 2003/066; A47F 9/005; A47B 53/00; A47B 53/02
USPC ....... 211/85.8, 1.57, 162, 151; 312/201, 202
See application file for complete search history.

(56) References Cited

U.S. PATENT DOCUMENTS

| | | | | |
|---|---|---|---|---|
| 2,927,696 | A * | 3/1960 | Michaels | A47B 53/00 |
| | | | | 211/27 |
| 3,082,876 | A * | 3/1963 | Cranmore | B65H 49/38 |
| | | | | 211/59.3 |
| 3,478,535 | A * | 11/1969 | Myers | A47F 3/0443 |
| | | | | 62/298 |
| 3,780,852 | A * | 12/1973 | Weiss | A47B 63/062 |
| | | | | 414/331.03 |
| 4,034,572 | A * | 7/1977 | Morris | A47F 3/0447 |
| | | | | 454/193 |
| 4,104,973 | A * | 8/1978 | Dwyer | A47F 5/0093 |
| | | | | 108/59 |
| 4,723,819 | A * | 2/1988 | Ramberg | A47F 5/02 |
| | | | | 211/144 |

(Continued)

FOREIGN PATENT DOCUMENTS

| | | |
|---|---|---|
| CN | 111688787 A | 9/2020 |
| KR | 101779284 B1 | 9/2017 |

*Primary Examiner* — Jennifer E. Novosad
(74) *Attorney, Agent, or Firm* — Husch Blackwell LLP

(57) ABSTRACT

A cart system is provided that includes a storage cart, a track, and, optionally, a shelf unit. The cart system is designed to allow a user to quickly and easily restock depleted products provided to consumers via the shelf unit. When the storage cart is coupled to the track, the motion of the cart may be guided or restricted by the track. Generally, the track may be provided with at least one linear portion and at least one T-shaped portion that define a predetermined path about which the storage cart may travel. Further, when coupled to the track, the storage cart may rotate such that the user can access the shelf unit or stow the cart substantially flush against or near the shelf unit.

7 Claims, 12 Drawing Sheets

(56) References Cited

U.S. PATENT DOCUMENTS

| | | | | |
|---|---|---|---|---|
| 4,991,725 | A * | 2/1991 | Welsch | A47B 53/02 |
| | | | | 312/201 |
| 5,072,838 | A * | 12/1991 | Price, Jr. | A47B 81/068 |
| 5,160,189 | A * | 11/1992 | Johnston | A47B 53/00 |
| | | | | 188/82.2 |
| 5,341,944 | A * | 8/1994 | Latino | A47B 81/068 |
| | | | | 211/94.01 |
| 5,593,048 | A * | 1/1997 | Johnson | A47F 1/04 |
| | | | | 211/184 |
| 5,938,047 | A * | 8/1999 | Ellis | B65G 1/0442 |
| | | | | 414/331.11 |
| 6,095,348 | A * | 8/2000 | Karashima | A47F 5/103 |
| | | | | 211/175 |
| 6,241,106 | B1 * | 6/2001 | Fujita | A47B 53/02 |
| | | | | 211/94.02 |
| 6,471,309 | B1 * | 10/2002 | Turner | A47F 5/10 |
| | | | | 312/201 |
| 6,561,365 | B2 * | 5/2003 | Bustos | A47F 5/0087 |
| | | | | 211/187 |
| 6,644,484 | B1 * | 11/2003 | Sardis | A47F 5/137 |
| | | | | 211/189 |
| 6,688,708 | B1 * | 2/2004 | Janson | A47B 53/02 |
| | | | | 312/265.5 |
| 6,726,039 | B2 * | 4/2004 | Boron | A47F 3/06 |
| | | | | 211/187 |
| 8,464,878 | B2 | 6/2013 | Andersen et al. | |
| 8,511,487 | B2 | 8/2013 | Andersen et al. | |
| 8,770,600 | B2 | 7/2014 | Preidt et al. | |
| 8,789,899 | B2 * | 7/2014 | Pirro | A47F 3/004 |
| | | | | 312/249.9 |
| 8,887,642 | B2 | 11/2014 | Simpson et al. | |
| 9,150,232 | B2 | 10/2015 | Chan | |
| 9,723,922 | B2 * | 8/2017 | Chen | A47B 88/956 |
| 9,801,465 | B1 * | 10/2017 | Finch, Jr. | A47B 46/005 |
| 9,809,240 | B2 * | 11/2017 | Broom | A61G 12/001 |
| 9,826,833 | B2 * | 11/2017 | Chen | A47B 55/02 |
| 9,999,301 | B2 * | 6/2018 | Stauffer | B65D 19/385 |
| 10,029,719 | B2 | 7/2018 | Leffler et al. | |
| 10,918,208 | B2 * | 2/2021 | Kenlon | A47B 47/024 |
| 11,083,290 | B2 | 8/2021 | Mcnichols | |
| 11,083,312 | B2 * | 8/2021 | Bersagel | A47F 5/0087 |
| 11,910,924 | B2 * | 2/2024 | Storck | A47B 88/42 |
| 2002/0162813 | A1 * | 11/2002 | Hall | A47F 5/137 |
| | | | | 211/133.1 |
| 2003/0094884 | A1 * | 5/2003 | Sobol | A47B 53/00 |
| | | | | 312/201 |
| 2004/0256339 | A1 * | 12/2004 | Welsch | A47B 53/02 |
| | | | | 211/162 |
| 2005/0132924 | A1 | 6/2005 | Bothun et al. | |
| 2005/0257548 | A1 * | 11/2005 | Grassmuck | A47F 3/063 |
| | | | | 62/250 |
| 2006/0163984 | A1 * | 7/2006 | Andersen | A47F 3/06 |
| | | | | 312/401 |
| 2007/0048112 | A1 | 3/2007 | Andersen et al. | |
| 2008/0272141 | A1 * | 11/2008 | Fitzgerald | A47B 46/00 |
| | | | | 221/154 |
| 2009/0038989 | A1 * | 2/2009 | Rego Garcia De Alba | A47F 5/108 |
| | | | | 206/736 |
| 2009/0266775 | A1 * | 10/2009 | Vanderhoek | A47B 47/024 |
| | | | | 211/49.1 |
| 2020/0154884 | A1 * | 5/2020 | Huang | A47B 88/42 |
| 2022/0163256 | A1 * | 5/2022 | Nicolaou | F25D 25/024 |

\* cited by examiner

SHELF-STOCKING UNIT

CROSS-REFERENCE TO RELATED APPLICATIONS

None.

FIELD OF INVENTION

The present invention relates generally to an apparatus used for stocking shelves, and more specifically to a shelf-stocking cart coupled to a device that efficiently guides the cart's movement.

BACKGROUND OF INVENTION

Convenience stores provide consumers with various food and beverage items that consumers can take with them "on the go." These food and beverage items are often stocked on shelves within the store that make it easy for the consumer to view and pick up items for purchase. The shelves normally include duplicates of the same item so that the items need not be restocked each time the item is purchased.

Eventually, as consumers purchase the food and beverage items, store employees replace depleted inventory on the shelves. The store's additional inventory used for restocking is typically remote from the shelves from which consumers purchase the items. As such, the employees usually load the additional inventory onto a cart and then transport the additional inventory to the shelves. Such carts generally have at least one rack that can hold food and beverage items and wheels that allow the carts to be pushed from location to location as the store's shelves are restocked.

Unfortunately, such carts present many issues for the employees during use. First, the carts can be unsteady and easily tip over if the additional inventory is not evenly distributed on the cart's racks. Second, typical carts are large and bulky, and can completely block any aisles provided between shelves, which in turn blocks consumers' access to the store's products while the shelves are being restocked. Third, the carts' size can make them inconvenient to store. They take up valuable space in the store's stockroom area where the additional inventory is housed. The carts can also be easily lost, stolen, or misplaced. Finally, if the employees do not use a cart during the restocking process, they must carry the product from the stockroom to the shelves. Not only is this inefficient, but employees risk injury from repeated lifting and carrying of the additional inventory.

SUMMARY OF INVENTION

The present invention overcomes many of the shortcomings and limitations of the prior art devices discussed above. The invention described includes several embodiments of a system including a shelf-stocking cart and a track. The system may be used to replenish depleted consumer products on shelves positioned in a storefront as the products are purchased by consumers.

The cart may include storage racks upon which additional product may be stored until the additional product is needed to replace depleted product on a shelf unit. The cart may also include an extension member that tethers, attaches, or otherwise couples the cart to a track. In a preferred embodiment, the extension member is positioned and located on a top surface of the cart, extends upwardly from the top surface, and is received into the track. When the extension member is received into the track, the track may guide and/or restrict the motion of the cart. In some embodiments of the invention, the extension member may be releasably coupled to the cart and/or the track such that the cart can be decoupled from the track and utilized away from the track.

The track may be mounted to various surfaces, including a shelf unit (via which consumers can access products for purchase), a ceiling, a wall, or a floor. Generally, the track defines a predetermined path upon which the cart can move and may also allow for the cart to be rotated about an axis. In a preferred embodiment, the track allows the cart to rotate such that it can be positioned substantially flush against and/or proximate to the shelf unit, which may allow for convenient storage of the cart. Further, the cart may rotate towards or away from the shelf unit so that a user can easily access the shelf unit for restocking. The track may include linear portions that allow the cart to move between different compartments of the shelf unit and T-shaped portions that allows the user to maneuver and/or rotate the cart between a "storage position" and a "shelf access position," as previously described.

Preferably, the cart includes five wheels coupled to a bottom portion of the cart. Four of the wheels may be positioned and located near the corners of the bottom portion and a fifth wheel may be positioned and located near the center of the bottom portion. The fifth wheel may help the cart maintain balance when the cart is loaded with product, and thus help prevent the cart from tipping over. The fifth wheel may also make the cart easier to pivot or rotate during use.

These and other aspects and advantages of the present invention will become apparent to those skilled in the art after considering the following detailed description in connection with the accompanying drawings.

Figure 1:
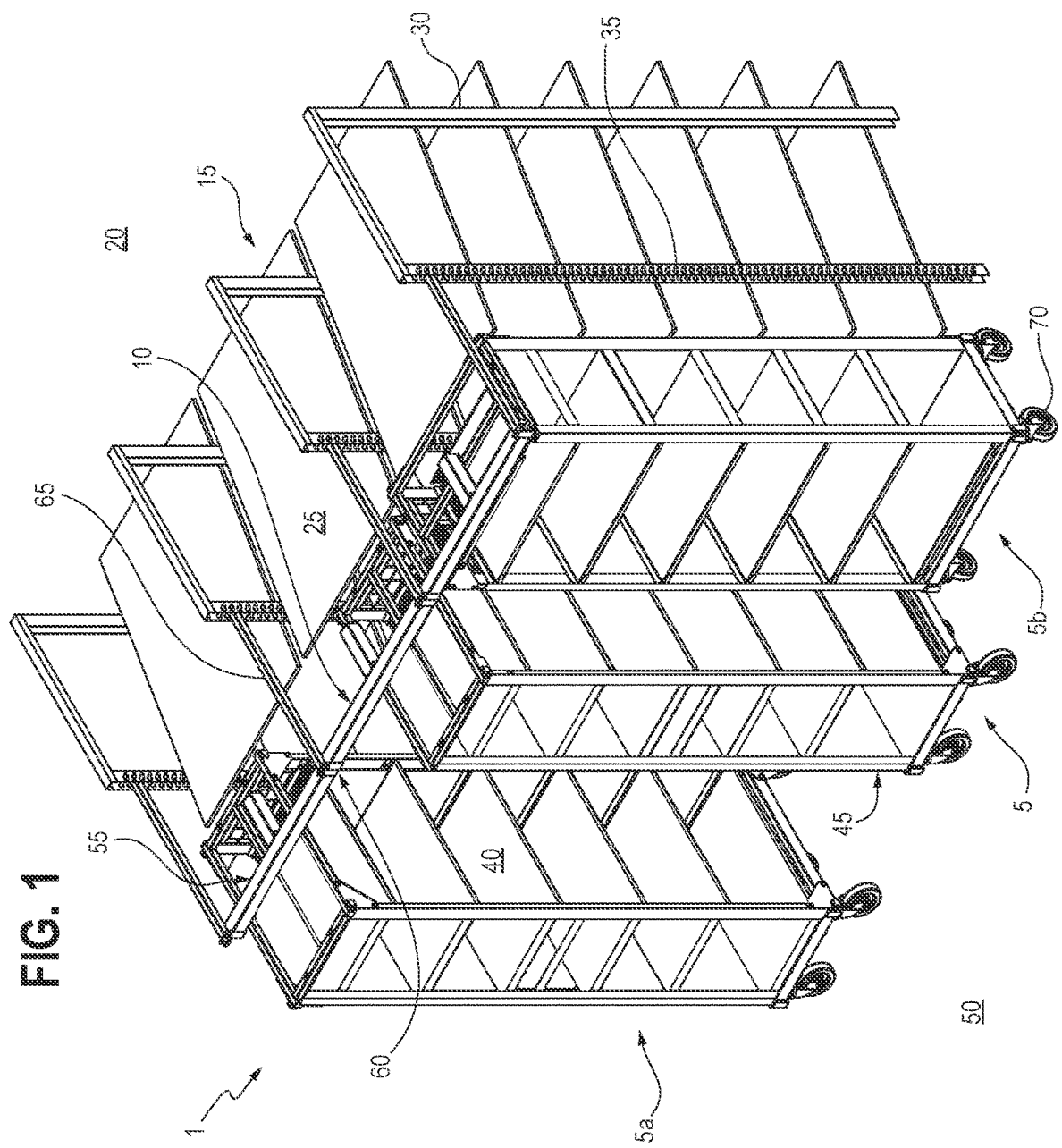
FIG. 1 is an isometric view of a system including a track and a plurality of storage carts coupled to a shelf unit, the system constructed according to the teachings of the present invention.

While the disclosure is susceptible to various modifications and alternative forms, a specific embodiment thereof is shown by way of example in the drawings and will herein be described in detail. It should be understood, however, that the drawings and detailed description presented herein are not intended to limit the disclosure to the particular embodiment disclosed, but to the contrary, the intention is to cover all modifications, equivalents, and alternatives falling within the spirit and scope of the present disclosure as defined by the appended claims.

DETAILED DESCRIPTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

FIG. 1 illustrates a cart system 1 comprising at least one shelf-stocking storage cart 5 (hereinafter, the "cart 5") and a track 10. The cart system 1 may be coupled to, or optionally provided with, a shelf unit 15. The shelf unit 15 may be designed to hold products (not illustrated) that can be accessed from a first location 20 proximate to the shelf unit 15. Preferably, the first location 20 is a location wherein consumers or others may remove products from the shelf unit. The shelf unit 15 may include at least one shelf 25 upon which the products can be positioned and located. If the shelf unit 15 is installed in a store, consumers may, when standing in the first location 20, remove the product from the shelves 25 for purchase.

The cart system 1 may: (1) facilitate convenient storage of the cart 5 when the cart 5 is not being used; (2) allow a user to access the shelf unit 15 when restocking the shelf unit 15; (3) provide a predefined path about which the cart 5 may travel; and (4) provide a cart with enhanced stability. The types of products that may be used with the cart system 1 are not restricted, but by way of example may include bottled beverages, canned beverages, refrigerated food products, non-refrigerated food products, clothing, electronic devices, paper products, and the like. Further, the locations where the cart system 1 can be installed or utilized are not particularly limited, but may include convenience stores, discount stores, drug stores, big-box stores, supermarkets, warehouse stores, warehouses, product processing centers, and the like.

Each shelf 25 may be attached to or coupled to supports 30 provided proximate to the shelves. The supports 30 may be provided with bores 35 via which a connection means (e.g., screws, nuts and bolts, and/or a portion of a body of the shelf 25) can be used to couple the shelves 25 to the supports 30. The shelves 25 may be provided as substantially flat surfaces upon which products can sit. Alternatively, the shelves 25 may downwardly tilt toward the first location 20 such that additional product can slide down the shelves 25 as product is removed from the first location 20 of the shelf unit 15. Additional components, such as racks and guides, may be provided on the shelves 25 as would be appreciated by those skilled in the art.

Any additional product (not illustrated) to be used during restocking of the shelf unit 15 may be provided remote from the cart system 1; if the additional product is remote from the cart system 1, the user may obtain the additional product and transport it to the cart 5. Alternatively, the additional product may be provided on the cart 5 prior to a time when a user is restocking the shelf unit 15. Each cart 5 may be provided with at least one rack 40 coupled to a body or frame 45 such that the cart 5 can retain the additional product used to restock the shelf unit 15.

Preferably, the cart 5 is positioned in or near a second location 50 that is proximate to the shelf unit 15 but inaccessible to consumers, although other locations for the cart 5 are foreseeable. Once the additional product is positioned on the cart 5, the user can assess what additional product is available to replenish the depleted inventory on the shelf unit 15. Advantageously, because the cart 5 can be moved along the track 10 and rotated as desired, the user can position the cart 5 such that he or she can stand near both the cart 5 and the shelf unit 15, which may allow the user to quickly replenish the depleted inventory.

The linear and rotational motion of the cart 5 in the system 1 may allow for easy use and convenient storage of the cart 5. Generally, when the cart 5 is coupled to the track 10, the motion of the cart 5 in the second location 50 may be limited to a predefined path defined by the track 10. The predefined path may correspond to at least one linear portion 55 and/or at least one T-shaped portion 60 of the track 10. When the user desires to move the cart 5, the user may push the cart 5 in a direction parallel to the linear portion 55 or parallel to a stem 65 of the T-shaped portion 60.

The cart 5 may rotate about an axis in the clockwise or counterclockwise directions such that the user can change the orientation of the cart 5 relative to the shelf unit 15. For example, the user may rotate the cart 5a into a first position wherein the cart 5 is perpendicular to the shelf unit 15. When the cart 5a is in the first position, a user may access the shelf unit 15 while standing, kneeling, or sitting proximate to the cart 5a, which may allow the user to easily restock the shelf unit 15. In addition, the user may rotate the cart 5b into a second position wherein the cart 5 is parallel to the shelf unit 15. When the cart 5b is in the second position, the cart 5b does not protrude as far into the second location 50, increasing the amount of space available for storage of other equipment and/or additional product in the second location 50. The cart 5 can be placed at various locations between the first and second positions, as would be understood by one skilled in the art.

The movement of the cart 5 may be facilitated by wheels 70 which reduce the amount of friction between the cart 5 and the surface upon which the cart 5 is placed. The wheels 70 may assist the user in moving the cart 5 along the track 10 and/or rotating the cart 5. Preferably, the cart 5 is provided with at least five wheels 70, which (as explained further with reference to FIG. 2 below) may increase the stability of the cart 5. However, the cart 5 may also be provided with more or fewer wheels 70, as would be appreciated by those skilled in the art.

Figure 2:
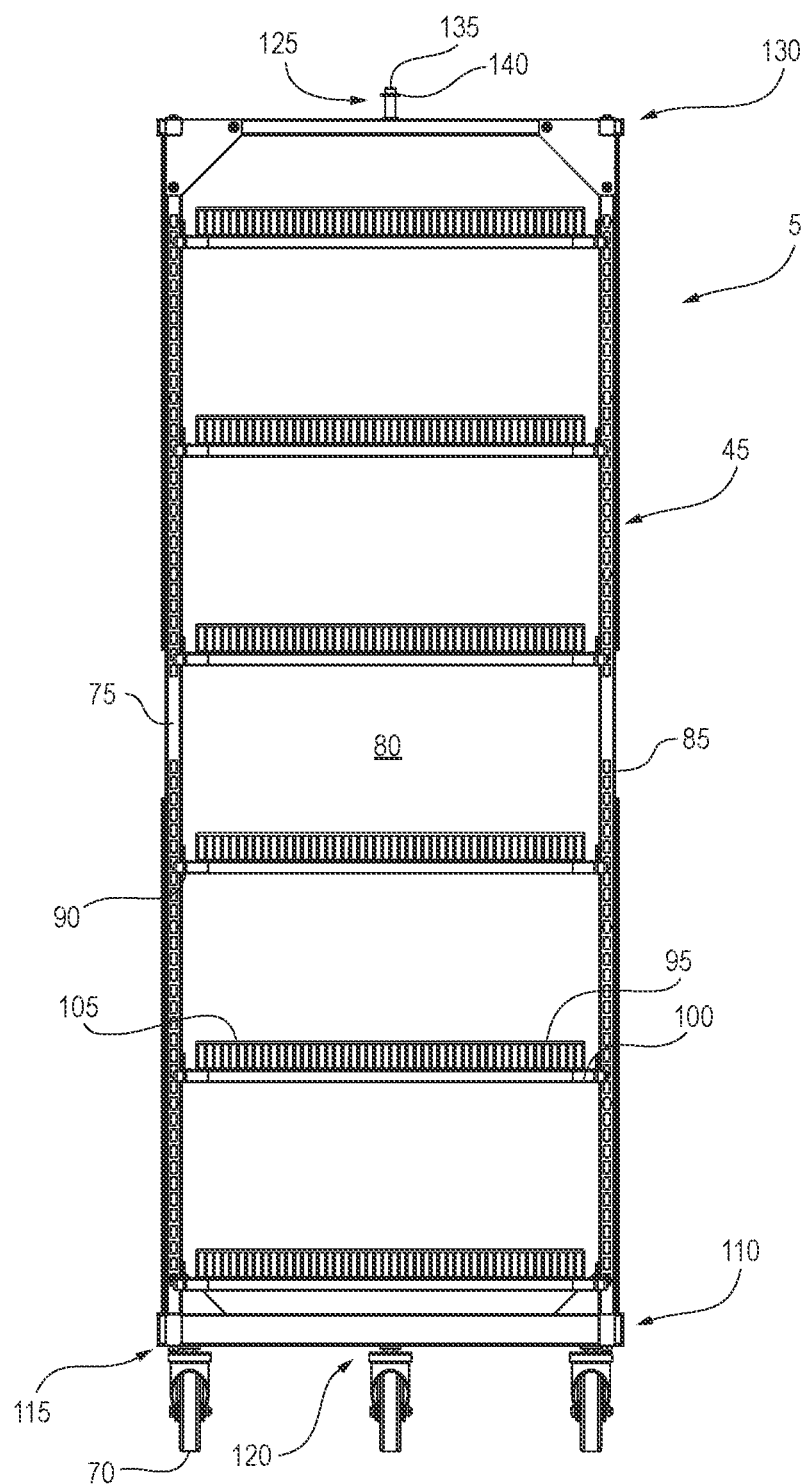
FIG. 2 is a front elevation view of a storage cart of FIG. 1.

Turning to FIG. 2, the frame 45 of the cart 5 may be provided as a rectangular prism, although other shapes for the frame 45 are foreseeable. Sides 75 of the frame 45 may be substantially open such that the racks 40 (and any products placed upon the racks 40) may be retained within an interior 80 of the frame 45. The frame 45 may include apertures 85 that extend at least partially through the frame 45 and via which the racks 40 may couple to the frame 45. For example, the racks 40 may include projections 90 that extend into the apertures 85 to couple the racks 40 to the frame, although other attachment means (e.g., screws, nuts and bolts, hooks) used to couple the racks 40 to the frame 45 are foreseeable.

The racks 40 may provide a substantially planar surface upon which product may be placed, or the racks 40 may be angled relative to a surface upon which the cart 5 is positioned. Optionally, the racks 40 may include at least one retaining structure 95 positioned along at least one side 100 of the rack 40. The retaining structures 95 may be selectively couplable to the racks 40 or may be provided as a permanent component of the racks 40. The retaining structures 95 may protrude upwardly from a top surface 105 of the rack 40. The retaining structures 95 may be designed to help prevent products from falling off of the cart 5. For example, when the products positioned on the cart 5 abut the retaining structures 95, movement of the products off of the rack 40 may be reduced.

Figure 10:
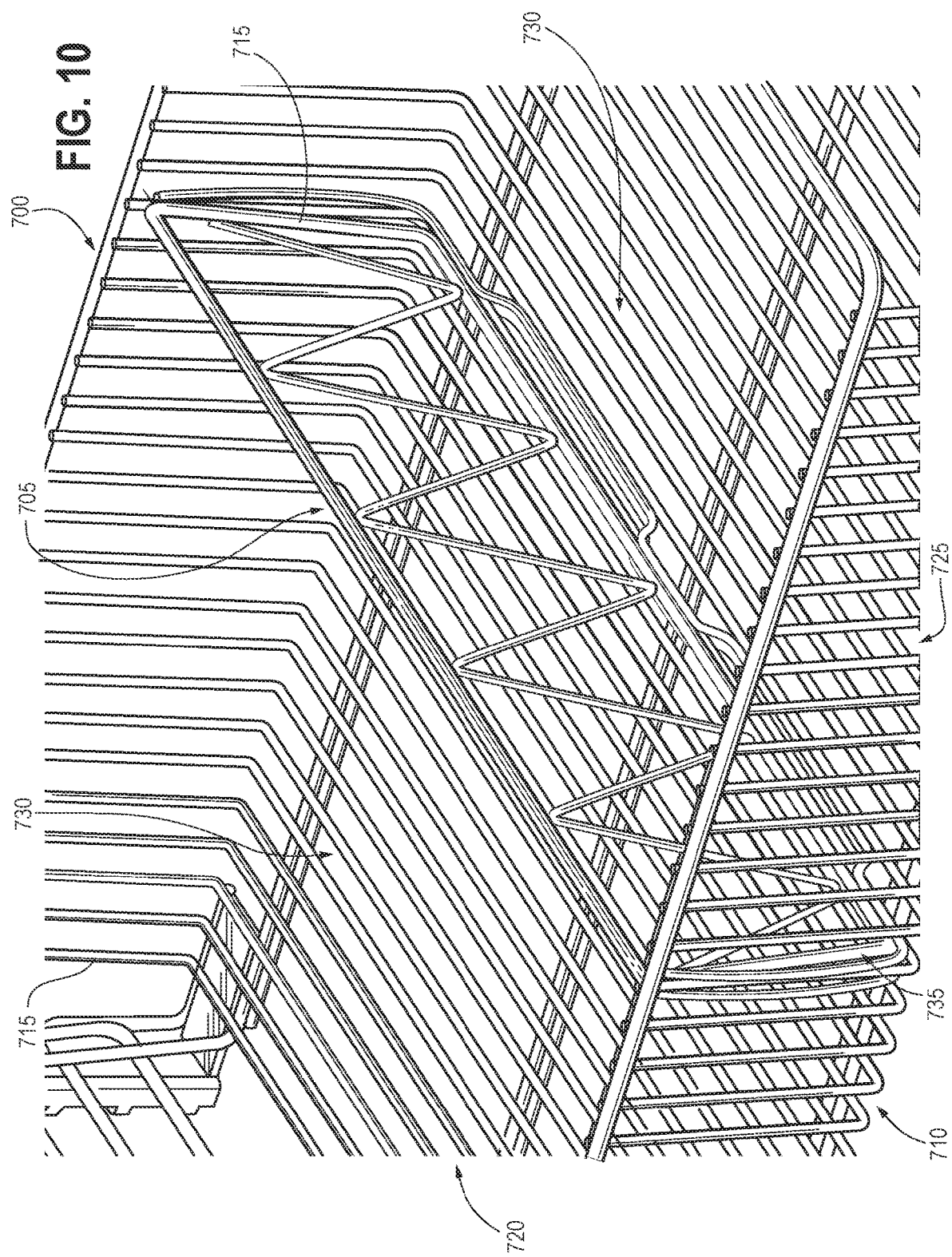
FIG. 10 is an isometric view of a basket including a divider, the basket and the divider constructed according to the teachings of the present invention.
Figure 11:
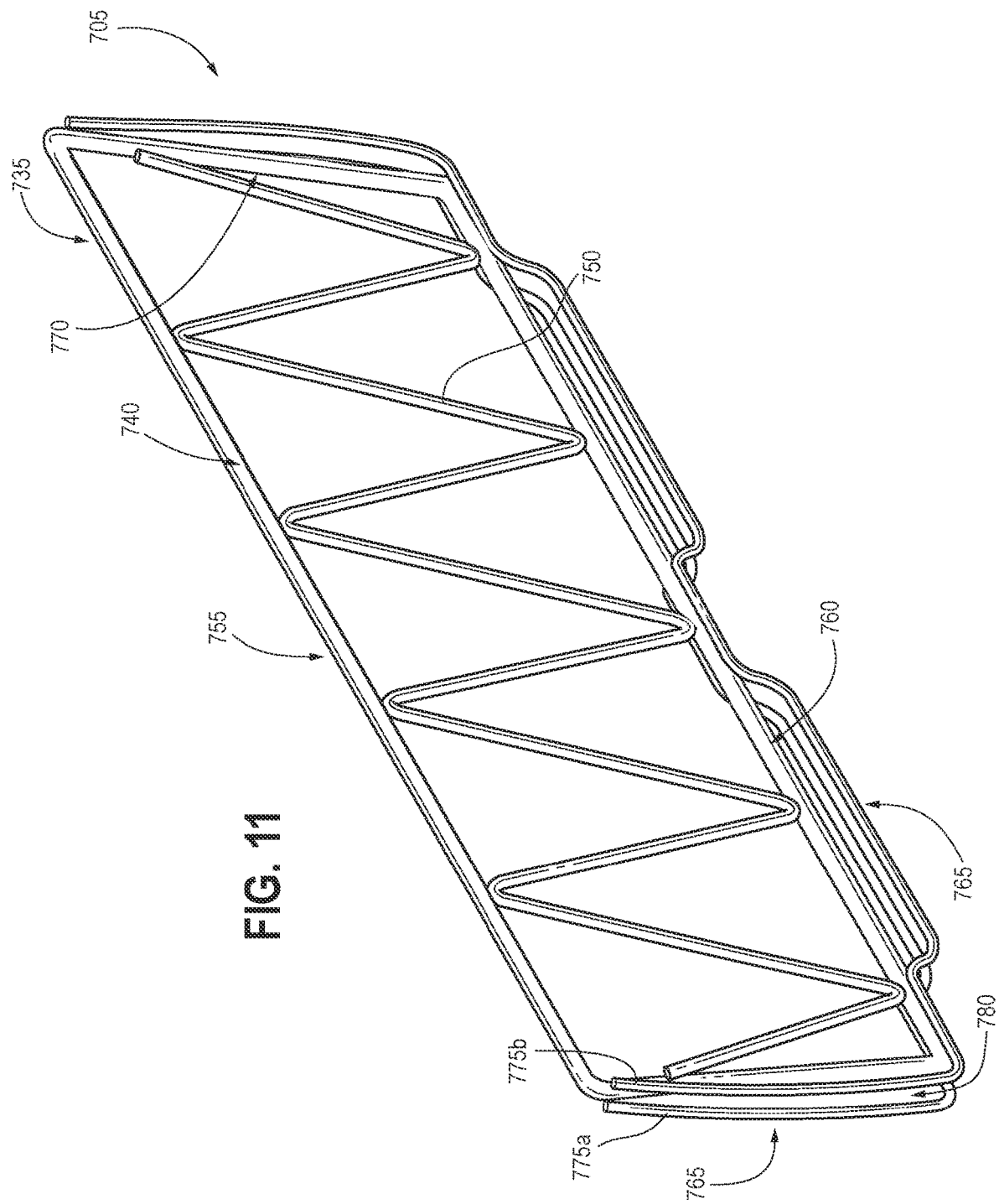
FIG. 11 is an isometric view of the divider of FIG. 10.
Figure 12:
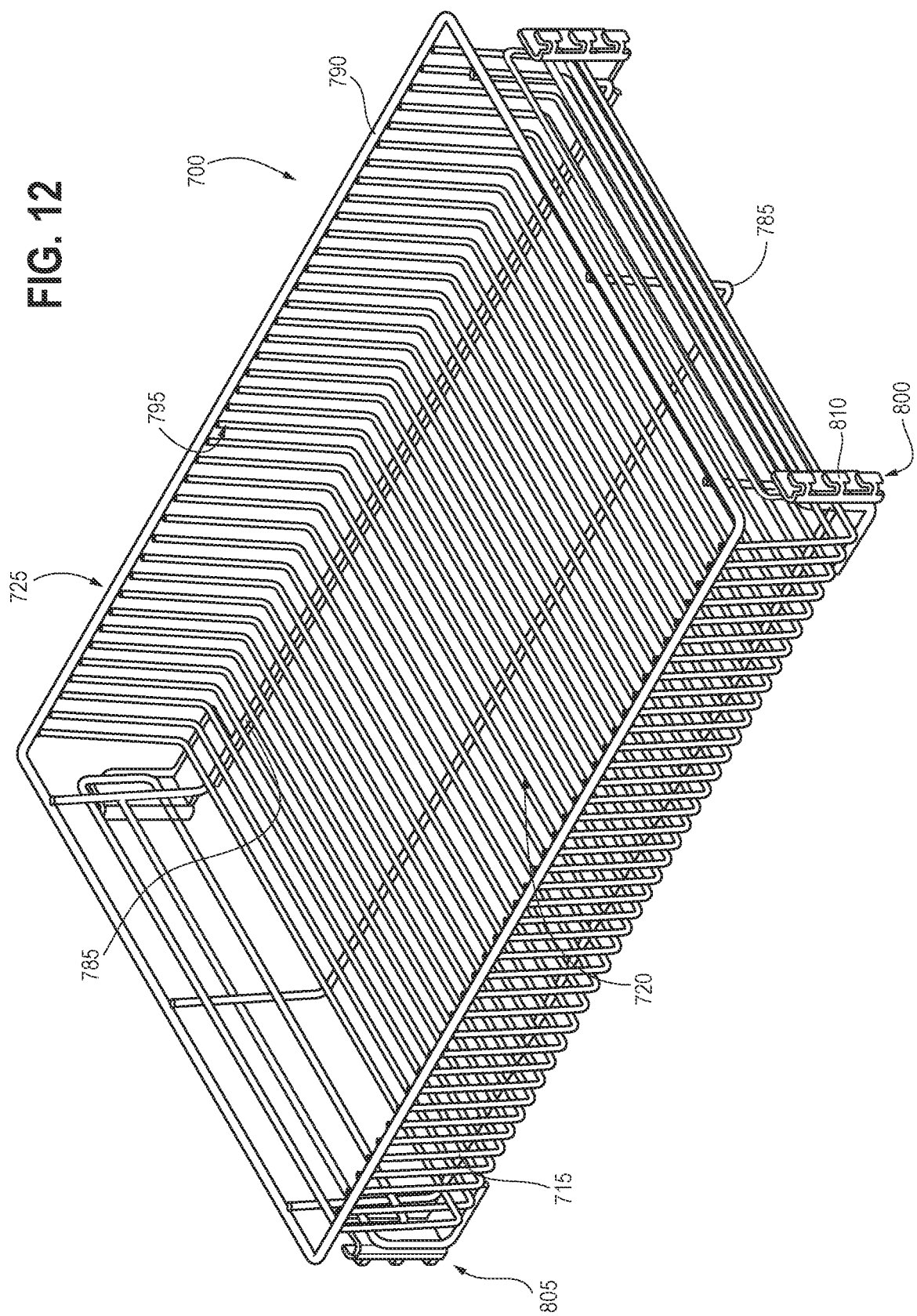
FIG. 12 is an isometric view of the basket of FIG. 10.

In some embodiments, the rack 40 may be provided as a basket, such as a basket 700 (illustrated in FIGS. 10 and 12). As will be discussed in more detail with reference to FIGS. 10-12, the basket 700 may include at least one divider 705 that can be used to organize products retained within the basket 700.

The frame 45 may include a bottom portion 110 to which wheels 70 may be coupled. The wheels 70 may reduce the amount of friction between the cart 5 and the floor surface upon which the cart 5 is located. Preferably, the cart 5 is provided with five wheels 70, although more or fewer wheels 70 may be provided in alternative embodiments of the cart 5. The wheels 70 may be arranged to enhance the stability of the cart 5. For example, if the frame 45 is provided as a rectangular prism, one wheel 70 may be positioned and located proximate to each corner 115 of the bottom portion 110, and an additional wheel 70 may be positioned and located near a center 120 of the bottom portion 110. The wheel 70 positioned near the center 120 may provide enhanced stability to the cart 5 by providing support to the cart 5 near the center of mass of the cart 5. However, one skilled in the art would appreciate that the wheels 70 may be positioned and located elsewhere on the bottom portion 110, particularly if the cart 5 is provided in alternative shapes.

The frame 45 may also include an extension member 125 coupled to a top portion 130 of the frame 45. The extension member 125 may generally be provided as a three-dimensional structure (e.g., as a polygon or a cylinder) with a first end 135 that extends upwardly and away from the top portion 130. The extension member 125 may couple the cart 5 to the track 10 or any of the tracks described in FIGS. 3-7. Optionally, the extension member 125 may include a projection 140 located on or proximate to the first end 135 that is adapted to help retain the extension member 125 within a track such as the track 10 when the cart 5 is coupled to the track 10.

Figure 3:
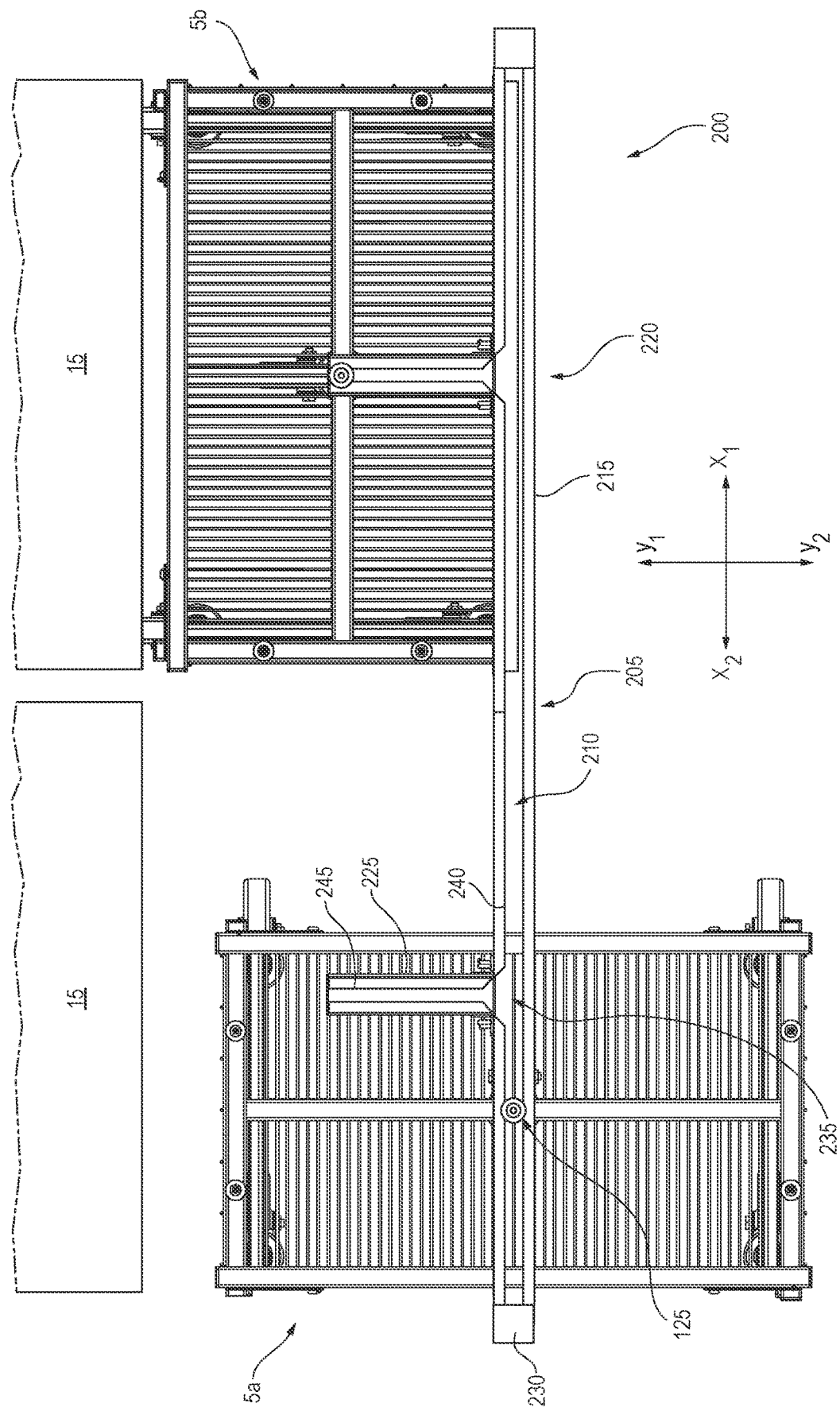
FIG. 3 is a top plan view of the system including a track and a plurality of storage carts of FIG. 1, with a top segment of the track removed so that the interior components of the track are visible.

Turning next to FIG. 3, a cart system 200 including carts 5a, 5b is provided, although more or fewer carts 5 may be provided in alternative embodiments of the system 200. When the cart 5 is coupled to a track 205, the first end 135 of the extension member 125 may be received by and/or extend through a channel 210 provided in the track 205. Generally, the channel 210 may be provided in linear portions 215 and/or T-shaped portions 220 of the track 205 and extend at least partially therethrough.

When coupled to the track 205, the cart 5 may move along a predetermined path defined by the linear portions 215 and/or the t-shaped members 220 of the track 205. For example, the cart 5 may move in a first direction $X_1$ and a second direction $X_2$ corresponding to the linear portion 215 and in a third direction $Y_1$ and a fourth direction $Y_2$ corresponding to a stem 225 of the T-shaped portion 220. Generally, the first and second directions $X_1$, $X_2$ are parallel to the shelf unit 15 and the third and fourth directions $Y_1$, $Y_2$ are perpendicular to the shelf unit 15, although other directions of movement for the cart 5 are foreseeable.

The cart 5a provides an illustrative example of the motion permitted by the track 205 when the cart 5a is coupled thereto. As illustrated, the cart 5a is positioned under the linear portion 215 of the track 205. If a user pushes the cart in the second direction $X_2$, the extension member 125 may eventually abut an end 230 of the track 205. If a user pushes the cart 5a in the first direction $X_1$, the extension member 125 may eventually reach a junction 235. Once the extension member is within or proximate to the junction 235, the user may continue to push the cart 5a in the first direction $X_1$, or the user may push the cart 5a in the third direction $Y_1$ towards the shelf unit 15. Once the cart 5a is positioned below the stem 225, if the user wishes to return the cart to the linear portion 215 of the track 205, the user may push the cart in the fourth direction $Y_2$ and towards the junction 235 until the extension member 125 is within or proximate to the junction 235. After the cart 5a is returned to the junction 235, the user may again move the cart 5a in the first and second directions $X_1$, $X_2$.

When the cart 5a is positioned below the linear portion 215, the motion of the cart 5a in the third and fourth directions $Y_1$, $Y_2$ may be restricted by the track 205. For example, if the user attempts to move the cart 5a in the third direction $Y_1$, the extension member 125 will abut a side 240 of the channel 210. Once the extension member 125 abuts the side 240, further motion of the extension member 125 is prevented in the third direction $Y_1$, and the cart 5a may no longer move in the third direction $Y_1$. Similarly, if the extension member 125 is positioned in the stem 225, the movement of the extension member 125 may be restricted in the first and second directions $X_1$, $X_2$. For example, if the user attempts to move the cart 5a in the first direction $X_1$, the extension may abut a side 245 of the channel 210. Once the extension member 125 abuts the side 245, the cart 5a may no longer move in the first direction $X_1$.

The teachings regarding the movement of the cart 5a also apply to the cart 5b, to any of the carts 5 described herein, and any of the cart systems described herein.

In alternative embodiments of the invention, the track 205 may be provided with additional or fewer T-shaped members 220 and additional or fewer linear portions 215. Further, the track 205 may be provided with curved portions, S-shaped portions, and/or portions with other shapes as would be appreciated by those skilled in the art. As such, one skilled in the art would also appreciate that, in these alternative embodiments, the cart 5 may move in additional directions besides the first, second, third, and fourth directions $X_1$, $X_2$, $Y_1$, $Y_2$ as described above.

When the cart 5 is coupled to the track 205, the user may rotate the cart 5 about at least a first axis. The first axis may extend from a surface the cart 5 is provided on and through the extension member 125. The rotation of the cart 5 about the first axis may occur in the clockwise direction and/or the counterclockwise direction. This rotation about the first axis may allow a user to place the cart 5 substantially flush against the shelf unit 15 (e.g., see the cart 5b), perpendicular to the shelf unit 15 (e.g., see the cart 5a), and in any position therebetween, as would be appreciated by those skilled in the art.

Figure 4:
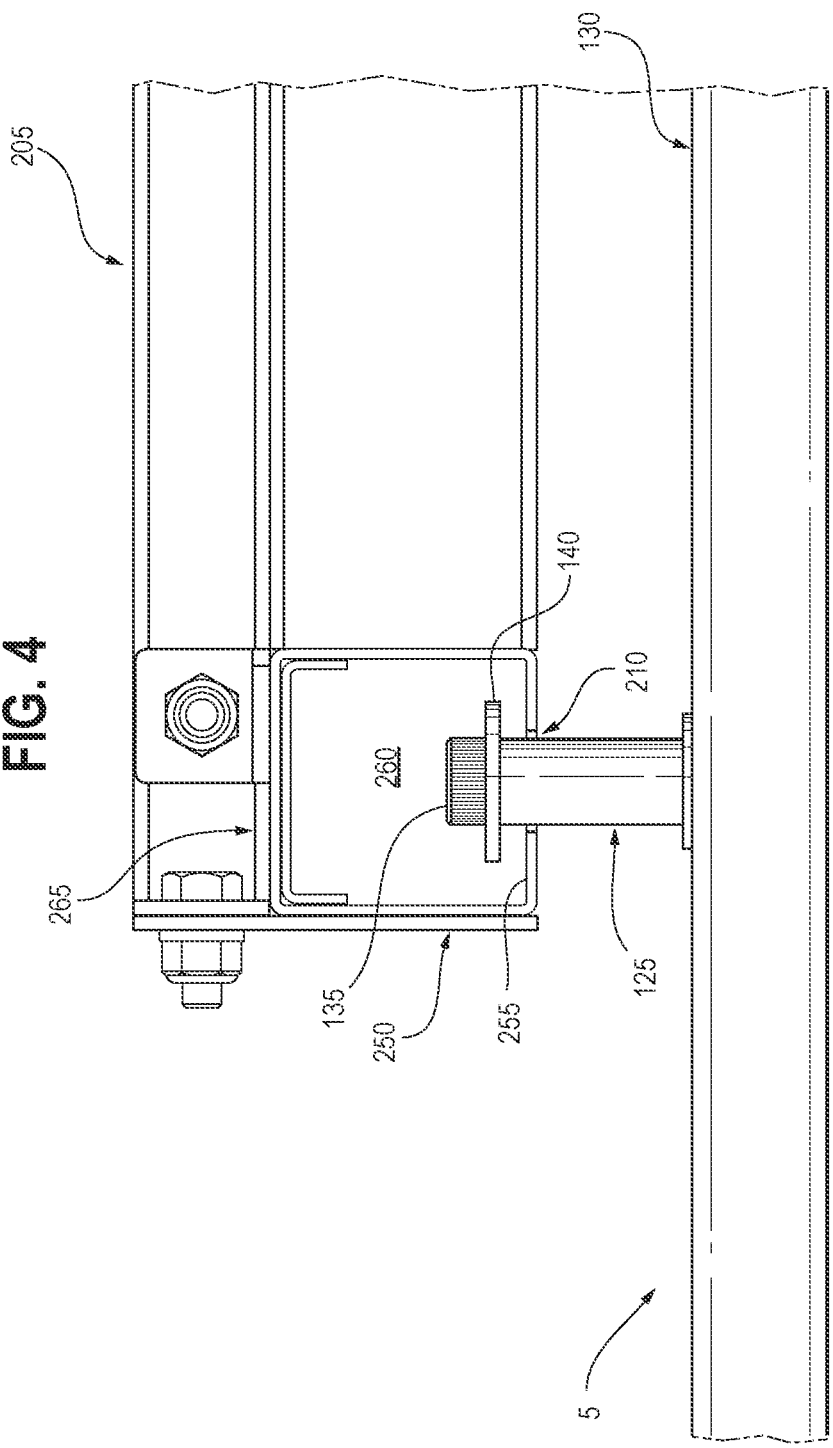
FIG. 4 is a cross-sectional view of an extension member received into the track of FIG. 3.

As illustrated in FIG. 4, the extension member 125 may protrude upwardly from the top portion 130 of the frame 45 into a body 250 of the track 205 through the channel 210. The body 250 of the track 205 may be provided as a rectangular prism, although other shapes for the body 250 are foreseeable. The channel 210 may be provided on a bottom surface 255 of the body 250, and may extend at least partially through the bottom surface 255. The body 250 may further include a void 260 (into which the extension member 125 of the cart 5 may extend) and a top segment 265. The top segment 265 may extend over the void 260 and may help prevent debris or other materials from falling into and obstructing the channel 210.

When the extension member 125 is received into the track 205, the first end 135 and optionally the projection 140 may be retained within the body 250. The width of the channel 210 may be the same as, or somewhat larger, than the width of the extension member 125. Preferably, the width of the projection 140 is larger than the width of the channel 210 such that undesired downward motion of the extension member 125 is prevented. When the extension member 125 is retained within the track 205, the channel 210 may restrict the freedom of motion of the extension member 125 (and thus the cart 5).

In some embodiments, the extension member 125 is releasably coupled to the cart 5 and/or the track 205 such that the cart 5 may be decoupled from the cart 5. In some embodiments, the projection 140 may be collapsible such that its width is the same as or slightly smaller than the width of the channel 210, which may allow a user to remove the extension member 125 from the track 205 by moving the extension member 125 in a downwards direction.

Figure 5:
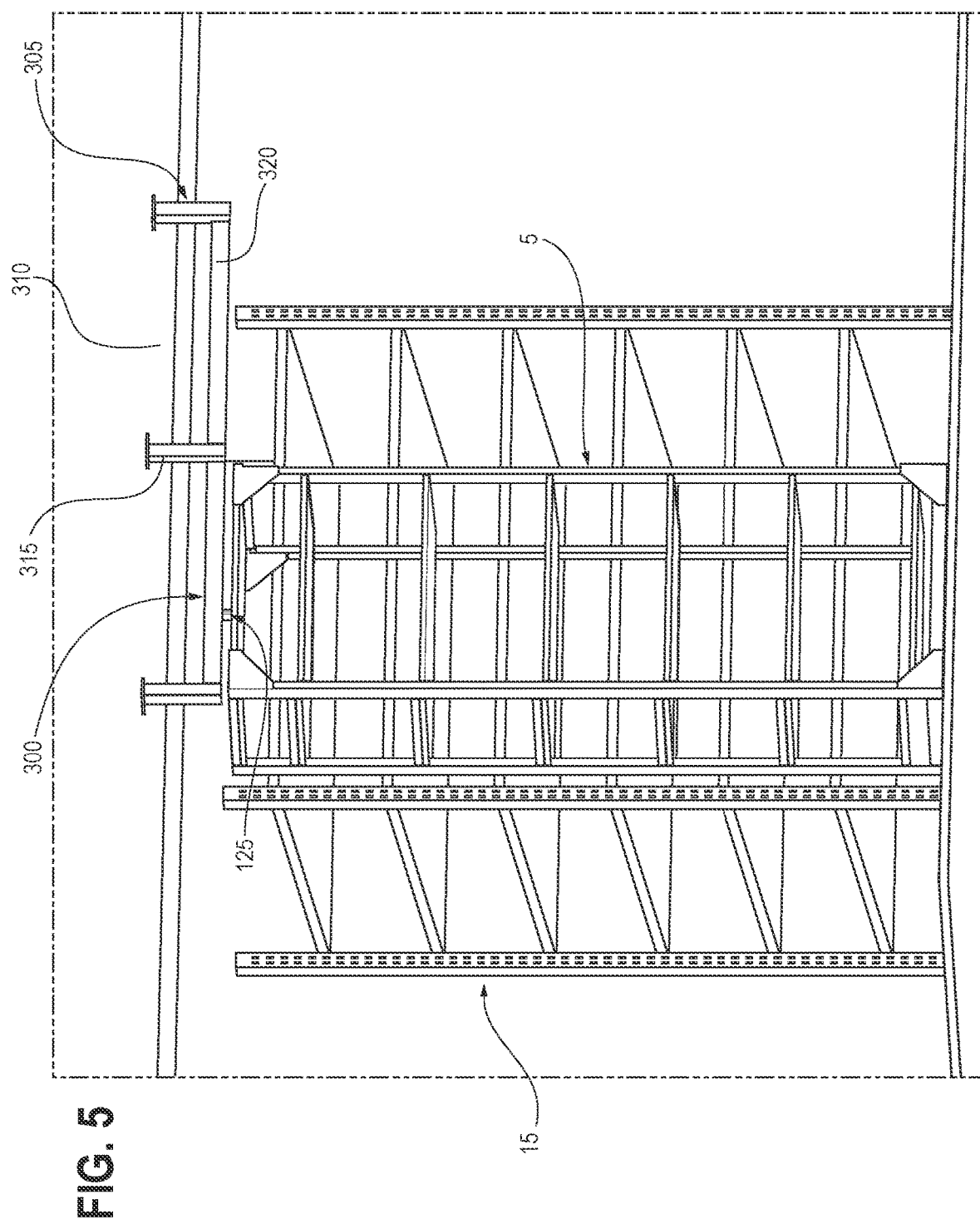
FIG. 5 is an isometric view of a storage cart coupled to a first alternative embodiment of the track.
Figure 6:
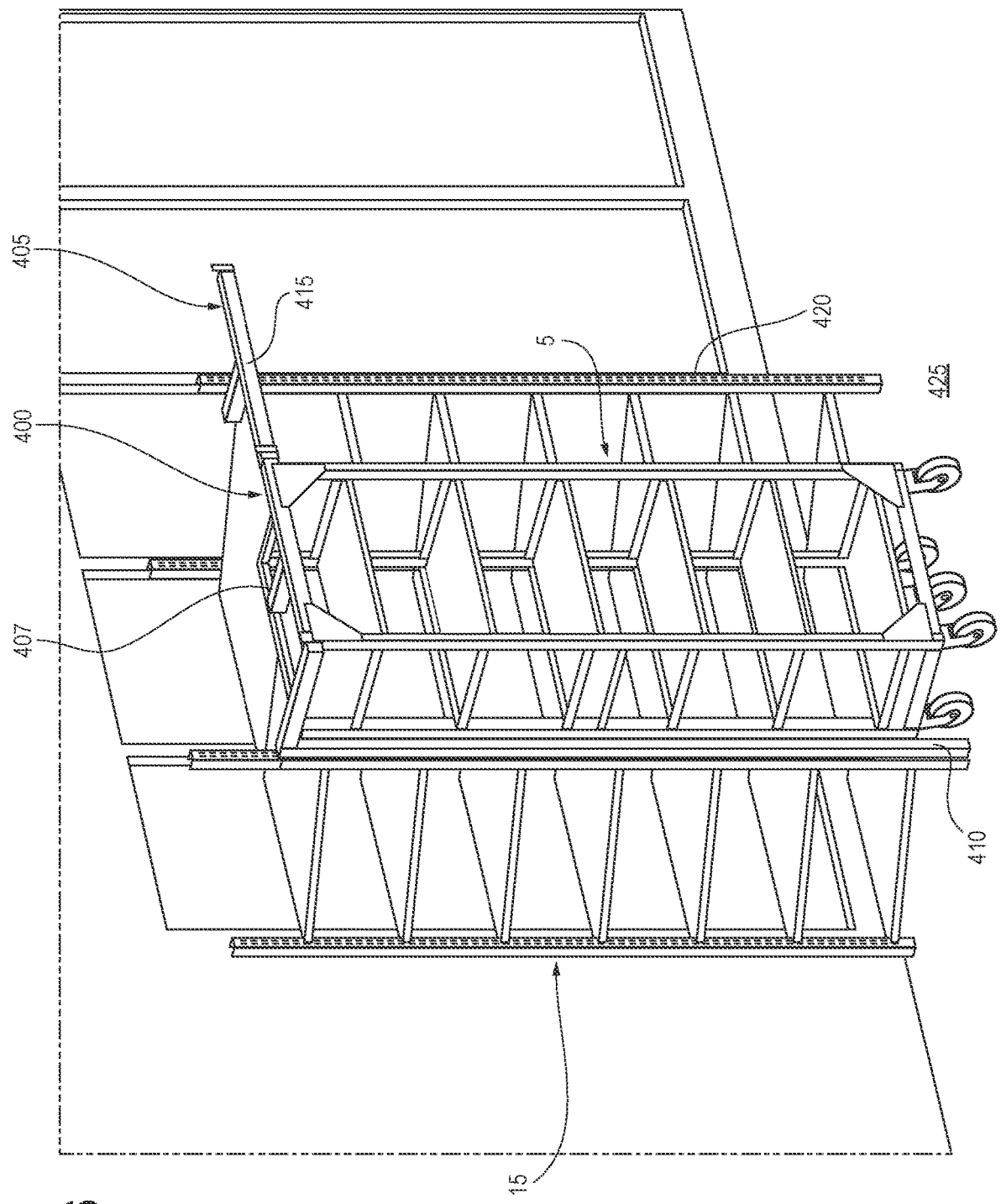
FIG. 6 is an isometric view of a storage cart coupled to a second alternative embodiment of a track.
Figure 7:
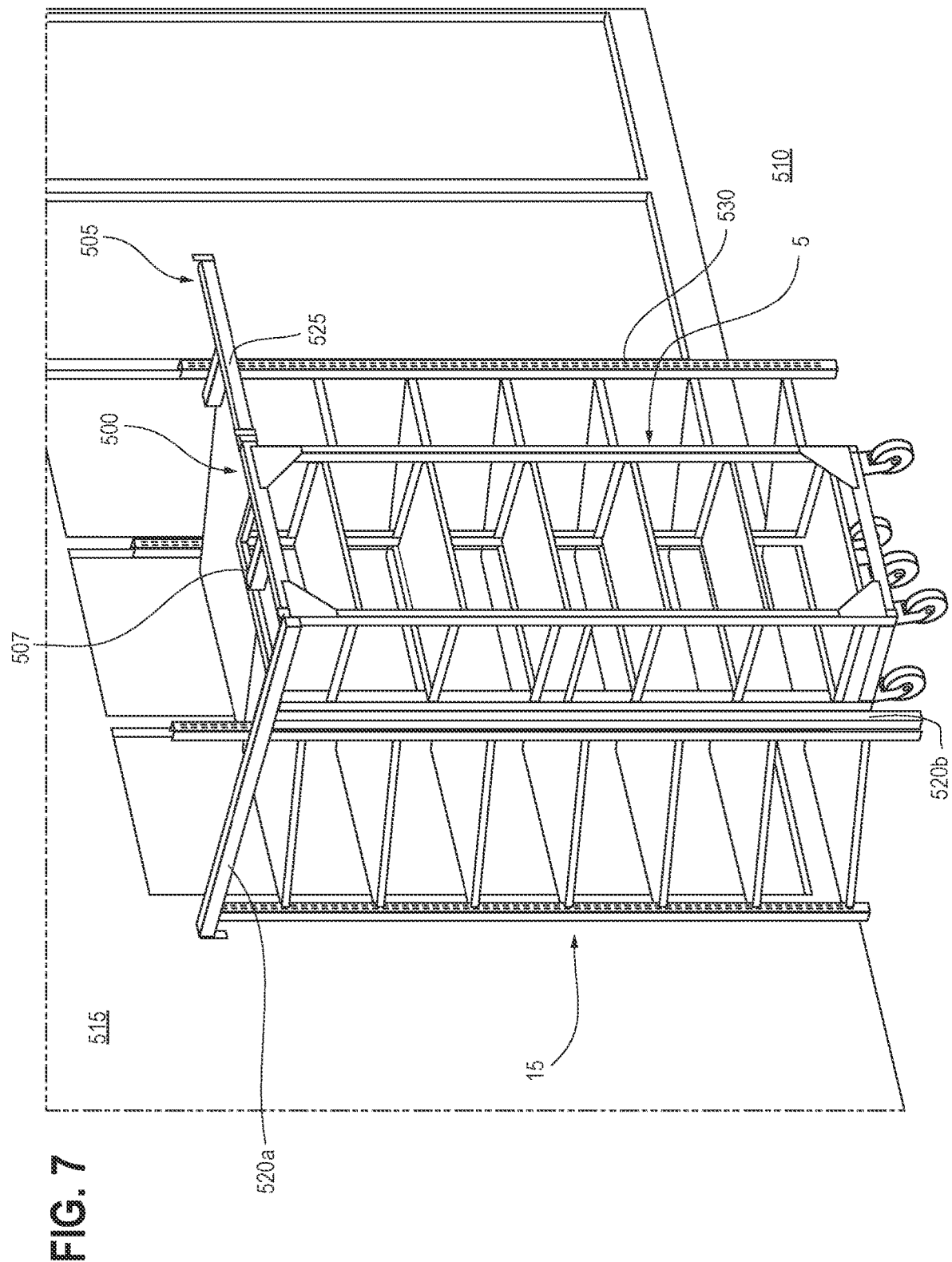
FIG. 7 is an isometric view of a storage cart coupled to a third alternative embodiment of a track.

FIGS. 5-7 provide alternative embodiments (i.e., systems 300, 400, and 500) of cart systems previously described herein. Specifically, the tracks 305, 405, and 505 provide illustrative examples of how any of the tracks described herein may be coupled to the shelf unit 15, a ceiling provided above the cart systems described herein, to a floor provided below the cart systems described herein, a wall proximate to the shelf unit 15, or combinations thereof. For example, in FIG. 5 the track 305 is coupled to a ceiling 310 via connecting portions 315. The connecting portions 315 may be coupled to a linear portion 320 of the track 305 and extend upwardly therefrom. Alternatively, the linear portion 320 and the connecting portions 315 may be provided as one piece. The connecting portions 315 may be attached to or coupled to the ceiling 310 via hooks, screws, nuts and bolts, or other attachment mechanisms known to those skilled in the art.

In FIG. 6, the cart 5 is coupled to a t-shaped portion 407 of the track 405. The extension member 125 of the cart 5 is not visible in FIG. 6 due to the angle at which the perspective view is illustrated. The track 405 is coupled to the shelf unit 15 itself via connecting portions 410. Here, the connecting portions 410 extend outwardly and away from linear portions 415 of the track 405 until the connecting portion 410 abuts the shelf unit 15. Once the connecting portion 410 abuts the shelf unit 15, the connecting portion 410 may extend downwards and towards a floor 420 until it abuts the floor 420. The connecting portion 410 may be coupled to the shelf unit 15 via protrusions (not illustrated) that extend into apertures 425 provided in the shelf unit 15. Alternatively, the connecting portions 410 may be attached to or coupled to the shelf unit 15 via hooks, screws, nuts and bolts, or other attachment mechanisms known to those skilled in the art. Further, in some embodiments of the invention, the connecting portion 410 may be coupled to the floor 420 via attachment mechanisms including hooks, screws, nuts and bolts, or other attachment mechanisms known to those skilled in the art.

Turning to FIG. 7, the cart 5 is coupled to a t-shaped portion 507 of the track 505. The extension member 125 of the cart 5 is not visible in FIG. 7 due to the angle at which the perspective view is illustrated. The track 505 is coupled to the shelf unit 15, the floor 510 and the wall 515. First, a connecting portion 520a may extend away from the linear portion 525 of the track 505 and towards the wall 515 until the connecting portion 520a abuts the wall 515. The connecting portion 520a may be coupled to the wall 515 via attachment mechanisms including hooks, screws, nuts and bolts, or other attachment mechanisms known to those skilled in the art. Second, a connecting portion 520b may extend downwardly from the connecting portion 520a and abut the shelf unit 15. The connecting portion 520b may be coupled to the shelf unit 15 via protrusions (not illustrated) that extend into apertures 530 provided in the shelf unit 15. Alternatively, the connecting members may be attached to or coupled to the shelf unit 15 via hooks, screws, nuts and bolts, or other attachment mechanisms known to those skilled in the art. Further, in some embodiments of the invention, the connecting portion 520b may be coupled to the floor 510 and the wall 515 via attachment mechanisms such as hooks, screws, nuts and bolts.

One skilled in the art would appreciate that any number of connecting portions 315, 410, and 520 may be provided on any of the tracks described herein.

Figure 8:
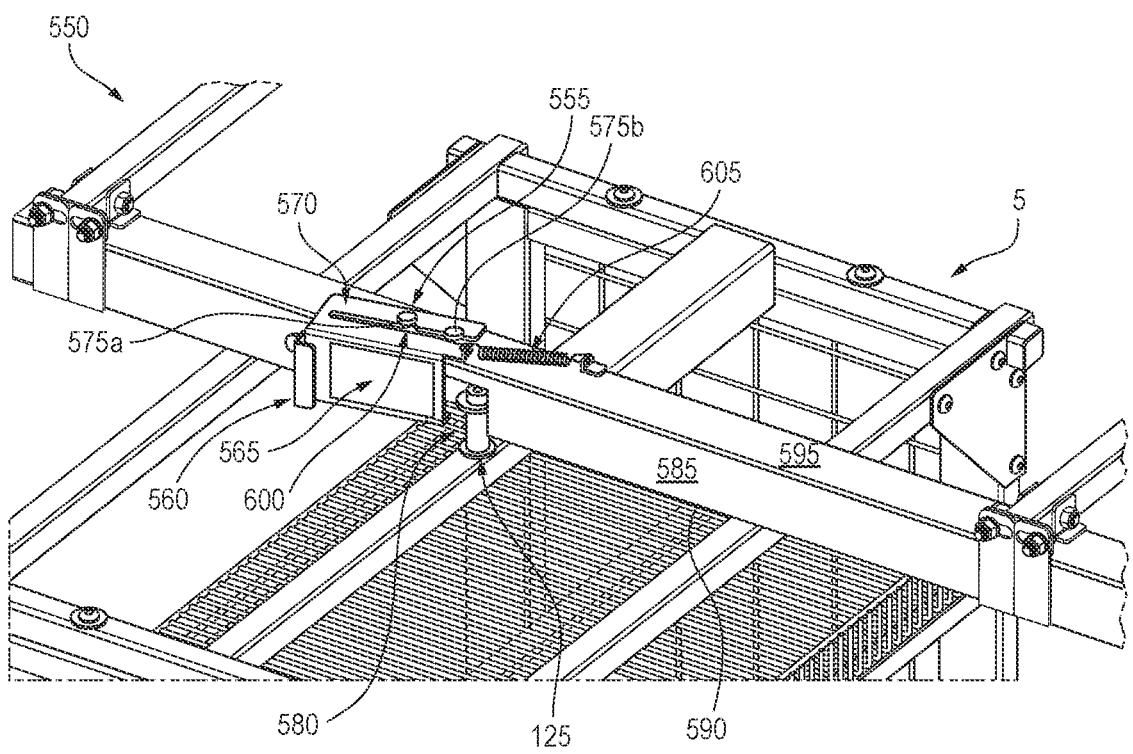
FIG. 8 is an isometric view of a storage track coupled to a fourth alternative embodiment of a track, an access door of the track in an open position.

Turning to FIG. 8, a track 550 with an access member 555 is provided. The access member 555 is configured such that the cart 5 can more easily be coupled to and decoupled from the track 550. The access member 555 may be provided in the form of a bracket 560 that is coupled to the track 550. In alternative embodiments, the access member 555 may be integrally formed from the track 550. The bracket 560 may be provided in the form of an L-shaped bracket wherein a first portion 565 and a second portion 570 are substantially perpendicular to each other, although other shapes and forms for the bracket 560 are foreseeable. The bracket 560 may be coupled to the track 550 via at least one pin 575 (the at least one pin 575 provided here as pins 575a and 575b) such that the bracket 560 can rotate when coupled to the track 550. Other attachment means for coupling the bracket 560 to the track 550 would be appreciated by those skilled in the art. In addition, the number of pins 575 that may be used to couple the bracket 560 to the track 550 is not particularly limited and may include fewer or additional pins 575 than those described herein.

Figure 9:
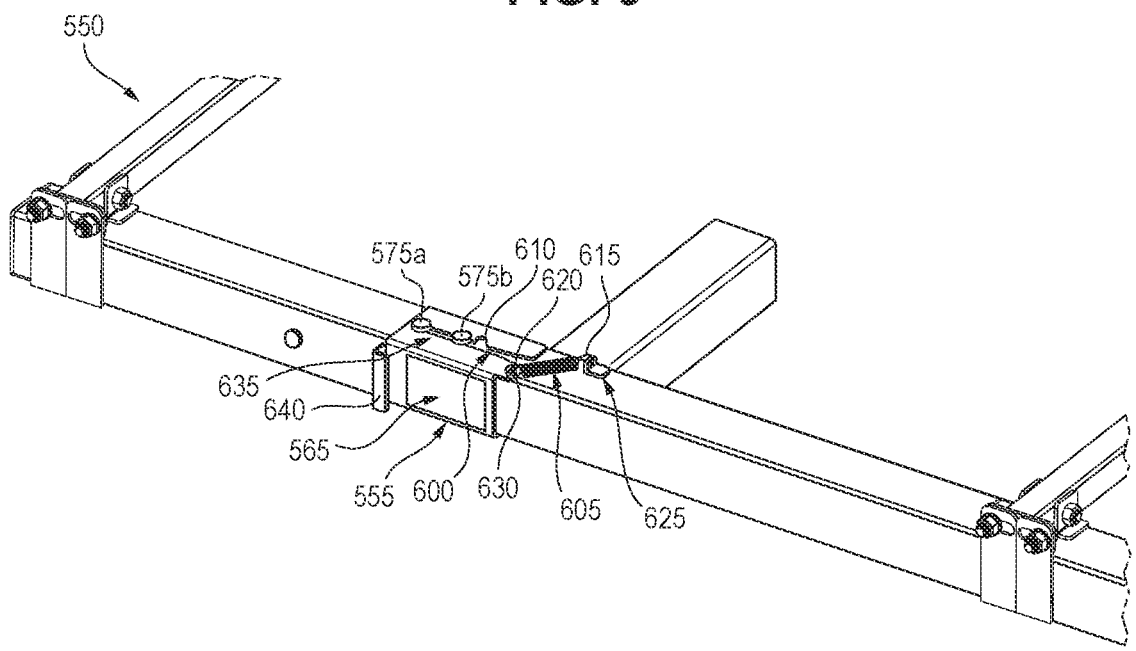
FIG. 9 is an isometric view of the track of FIG. 8, the access door of the track in the closed position.

The access member 555 may be placed into a first, open position and in a second, closed position (see FIG. 9). When the access member 555 is in the open position, a port 580 positioned and located in a side portion 585 of the track 550 may be revealed. The port 580 may be provided as an opening that extends through the side portion 585. For example, the port 580 may extend from a bottom edge 590 of the track 550 and towards a top surface 595 of the track 550. The position and the size of the port 580 may be adapted such that the extension member 125 of the cart 5 can move through the port 580 when the access member 555 is in the open position. Thus, when the access member 555 is in the open position, the cart 5 can be removed from the track 550 and/or coupled to the track 550.

Referring again to FIG. 8, the pins 575a, 575b may extend through a channel 600 located on the second portion 570 of the bracket 560. The pins 575a, 575b may couple to the top surface 595 of the track 550 when the pins 575a, 575b extend through the channel 600, although other positions for the pins 575a, 575b are foreseeable. The pins 575a, 575b, in conjunction with a spring 605, may help retain the access member 555 in the open and closed positions. For example, the channel 600 may include a notch 610 (best illustrated in FIG. 10) into which the pins 575a, 575b can be received. When the pin 575a is received in the notch 610, movement of the access member 555 is restricted because sides (not illustrated) of the notch 610 abut the pin 575a. The spring 605 may also apply a pulling force to the access member 555 such that the notch 610 is held against the pin 575a. In turn, until the user removes the pin 575a from the notch 610, the access member 555 may be held in the open position.

Referring now to FIG. 9, the spring 605 may include a first end 615 and a second end 620 that are coupled to the track 550 and the access member 555, respectively. The track 550 and the access member 555 may be coupled to or otherwise be provided with a spring-connecting portion 625 that is designed to couple the spring 605 to the track 550 and the access member 555. For example, the spring-connecting portion 625 may include an aperture 630 extending therethrough such that the ends 615, 620 of the spring 605 can be received by the spring-connecting portion 625.

The spring 605 may have a spring stiffness that allows the spring 605 to apply a force to the access member 555, whether the access door is in the open position, the closed position, or a position therebetween. For example, as described herein, when the access member 555 is in the open position the spring 605 may apply a force that helps retain the access member 555 in the open position. As an additional example, the spring 605 may apply a force to the access member 555 when the access member 555 is in the closed position to help prevent the accidental opening of the access member 555 (and thus, the accidental decoupling of the cart 5 from the track 550).

When the access member 555 is in the closed position, the port 580 is closed and the extension member 125 of the cart 5 may no longer exit the track 550 via the port 580. When the access member 555 is in the closed position, the pin 575a may be adjacent to a first end 635 of the channel 600 such that the pin 575a abuts the outermost edges (not illustrated) of the first end 635 of the channel 600. Thus, the pin 575a may prevent motion of the access member 555 towards the spring 605 even though the spring 605 exerts a force on the access member 555 that pulls the access member 555 towards the spring 605.

The pin 575b may provide an axis about which the access member 555 can rotate, although full freedom of rotation of the access member 555 may be restricted by the pin 575a. Generally, the pin 575b may provide a pivot point about which the access member 555 rotates when the user applies a force to the access member 555, assisting the user in moving the access member 555 between the open and closed positions.

The access member 555 may further include a handle 640. The handle 640 may be provided on the first portion 565 of the bracket 560, although other positions for the handle 640 are foreseeable. The handle may be provided in the form of an L-shaped member that is coupled to or integrally formed from the first portion 565, although other shapes and forms for the handle 640 are foreseeable. The handle 640 may provide the user with a convenient location to grip the access member 555 as the user opens and/or closes the access member 555.

To move the cart 5 into the track 550 via the access member 555, the user may place the access member 555 into the first, open position by grasping the handle 640 and pulling on the bracket 560 outwardly and away from the track 550. Preferably, when the user opens the access member 555, the user arranges the access member 555 such that the pin 575a is received into the notch 610. Once the access member 555 is opened, the user may move the cart 5 towards the track 550 such that the extension member 125 of the cart 5 substantially axially aligns with the port 580. Then, the user may continue moving the cart 5 towards the track 550 until the extension member 125 is received into the track 550 (e.g., the cart 5 may be received in the track 550 when the extension member 125 is substantially under the top surface 595 of the track 550). Optionally, after the extension member 125 is received into the track 550, the user may position the access member 555 in the second, closed position. Once the cart 5 is coupled to the track 550, the motion of the cart 5 may be guided by the track 550 similarly to how the tracks 10, 305, 405, and 505 guide the motion of the cart 5.

To remove or decouple the cart 5 from the track 550, the user may reverse the steps described herein until the extension member 125 is no longer received into the track 550. Optionally, the user may place the access member 555 in the second, closed position after the cart 5 is decoupled from the track 550.

Although only a limited number of examples of using the access member 555 are provided herein, one skilled in the art would appreciate that other methods of using the access member 555 would be consistent with the teachings described herein. Further, one skilled in the art would further appreciate that the access member 555 may be provided on any of the tracks described herein.

Turning next to FIG. 10, the basket 700 including the divider 705 is illustrated. The basket 700 may be provided in the form of a wire frame 710 wherein wires 715 are coupled to one another to form the basket 700. In alternative embodiments, the basket 700 may be constructed from other materials, as would be appreciated by those skilled in the art. The frame 710 may include a bottom portion 720, at least one side portion 725, and optionally a top portion (not illustrated) providing a cover for the basket 700. The bottom portion 720 and the side portions 725 may define at least one storage area 730 wherein products can be stored or received within the basket 700.

The divider 705 may be provided in the form of a wire frame 735 formed of wires 715, although alternative constructions for the divider 705 are also foreseeable. The divider 705 may couple to the basket 700 such that the basket 700 may be divided into two or more storage areas 730. The frame 735 may comprise a rectangularly-shaped wire 740 and an angled-wire 750, the angled-wire 750 connecting a top portion 755 and a bottom portion 760 of the rectangularly-shaped wire 740. The angled-wire 750 may provide structural support to the divider 705 such that the rectangularly-shaped wire 740 is substantially rigid.

Referring to FIG. 11, at least one connecting member 765 may be provided on the divider 705, wherein the connecting member 765 is adapted to selectively couple the divider 705 to the basket 700. The connecting members 765 may couple to or be integrally formed from the rectangularly-shaped wire 740. The connecting members 765 may be provided on the bottom portion 760 and side portions 770 of the rectangularly-shaped wire 740, although connecting members 765 could also be provided on the top portion 755 of the rectangularly-shaped wire 740. The connecting members 765 may protrude outwardly and away from the rectangularly-shaped wire 740 such that the connecting member 765 are capable of coupling to the basket 700 when the divider 705 is inserted into the basket 700. Specifically, the connecting members 765 may couple the divider 705 to the bottom portion 720 and/or the side portions 725 of the basket 700 (see FIG. 10).

The connecting members 765 may be provided in the form of individual wires (here, wires 775a and 775b) although the connecting members 765 may also be provided in alternative forms as would be appreciated by those skilled in the art. The wires 775a, 775b may be coupled to a perimeter of the rectangularly-shaped wire 740, the perimeter defined by the side portions 770 and the bottom portion 760. The wires 775a, 775b may run substantially parallel to each other along the perimeter of the rectangularly-shaped wire 740. The wires 775a, 775b may also define a gap 780 positioned between the wires 775a, 775b. The wires 715 of the basket 700 may be inserted into the gap 780. When the connecting members 765 are used to couple the divider 705 to the basket 700, the wires 715 of the basket 700 may be received into the gap 780 and abut the wires 775a, 775b of the connecting members 765 (see FIG. 10). Preferably, the wires 715 of the basket 700 may be secured in the gap 780 via a friction fit, although other means of coupling the wires 715 of the basket 700 to the connecting members 765 are foreseeable.

Turning next to FIG. 12, the structure of the basket 700 is further illustrated. The bottom portion 720 and the side portions 725 of the basket 700 may be formed from the same wires 715 (i.e., as substantially L-shaped wires, as illustrated), or each portion 720, 725 may be formed from different sets of wires 715 that are coupled to one another (e.g., wires provided in a linear shape that are coupled together). Further, the bottom portion 720 may be provided with at least one support wire 785 that may help the bottom portion 720 (and thus the basket 700 as a whole) hold more weight. The at least one support wire 785 may run substantially perpendicular to the wires 715 forming the bottom portion 720, although other positions for the at least one support wire 785 would be appreciated by those skilled in the art.

At least one safety wire 790 may be provided around the perimeter of the side portions 725. The at least one safety wire 790 may be coupled to ends 795 of the wires 715 that form the side portions 725. The at least one safety wire 790 may help protect the user from rubbing against the ends 795 of the wires 715 as the user inserts items into and/or removes items from the basket 700. In addition, the at least one safety wire 790 may provide additional structural integrity to the basket 700 by coupling the ends 795 of the wires 715 together.

The basket 700 may couple to the cart 5 described herein. The basket 700 may include brackets 800 coupled to the corners 805 of the basket 700, although other positions for the brackets 800 are foreseeable. In alternative embodiments, the brackets 800 may be integrally formed from the wires 715 making up the basket 700. The brackets 800 may include prongs 810 that protrude outwardly and away from the bracket 800. The prongs 810 may be sized and positioned such that they may selectively couple to any of the apertures 85 provided within the frame 45 of the cart 5 (see FIG. 2).

As would be appreciated by those skilled in the art, the wires described herein (e.g., the wires 715, 740, 750, 775, 785) may be the same, or the wires 715 may be different. For example, the wires may all be constructed from the same material (e.g., stainless steel) and may be provided with the same diameter. As an additional example, at least some of the wires may be comprised of a first material (e.g., stainless steel) while other wires may be comprised of a second material (e.g., plastic). Further, in some embodiments, the wires may include a protective coating (not illustrated) that help protect the wires from environmental conditions (e.g., moisture) and/or help protect the items within the basket from being damaged by the wires.

As is evident from the foregoing description, certain aspects of the present invention is not limited by the particular details of the examples illustrated herein, and it is therefore contemplated that other modifications, applications, variations, or equivalents thereof, will occur to those skilled in the art. Many such changes, modifications, variations and other uses and applications of the present constructions will, however, become apparent to those skilled in the art after considering the specification and the accompanying drawings. In addition, unless mention was made above to the contrary, it should be noted that all of the accompanying drawings are not to scale. All such changes, modifications, variations and other uses in applications which do not depart from the spirit and scope of the present inventions are deemed to be covered by the inventions which are limited only by the claims which follow.

The invention claimed is:

1. A cart system comprising:
a shelf unit including at least one shelf designed to hold a consumer product;
at least one cart, the at least one cart including a frame and an extension member, the extension member extending upwardly from a top portion of the frame; and
a track provided adjacent to the at least one cart, the track coupled to at least one of the shelf unit, a ceiling, a wall, and a floor,
wherein the extension member extends into and is received by the track such that movement of the cart corresponds to movement of the extension member within the track,
wherein the track is configured to allow movement of the cart in at least a first direction and a second direction,
wherein the second direction is substantially perpendicular to the first direction.

2. The cart system of claim 1, wherein the track is coupled to the shelf unit.

3. The cart system of claim 1, the at least one cart further including at least one rack coupled to the frame, the at least one rack providing a substantially planar surface upon which the consumer product may be positioned.

4. The cart system of claim 1, the at least one cart further including at least one basket coupled to the frame of the cart, a bottom portion and side portions of the at least one basket defining a first storage area within the basket, and wherein at least one divider can be selectively coupled to the basket to subdivide the first storage area into additional storage areas.

5. The cart system of claim 1, wherein the frame of the at least one cart further includes a bottom portion provided substantially in the shape of a rectangular prism, wherein a wheel is coupled proximate to each corner of the bottom portion, and wherein an additional wheel is coupled to the at least one cart substantially at a center of the bottom portion.

6. The cart system of claim 1, wherein the track further includes a linear portion and a T-shaped portion, and wherein the linear portion and the T-shaped portion define a predetermined path in which the at least one cart may move.

7. The cart system of claim 1, wherein the at least one cart can rotate about an axis provided through the extension member.

* * * * *